Aug. 1, 1967 H. T. KIFOR ET AL 3,333,797
INFLATED AIRBORNE DISPENSING APPARATUS
Filed Oct. 21, 1965 2 Sheets-Sheet 1

INVENTORS
PAUL V. BARTLETT
HARRY T. KIFOR
DAVID A. KREBS
BY: [signature]
ATTORNEY Aug. 1, 1967     H. T. KIFOR ET AL     3,333,797

INFLATED AIRBORNE DISPENSING APPARATUS

Filed Oct. 21, 1965     2 Sheets-Sheet 2

INVENTORS
PAUL V. BARTLETT
HARRY T. KIFOR
DAVID A. KREBS

BY: *H. H. Oldham*

ATTORNEY

United States Patent Office 3,333,797
Patented Aug. 1, 1967

3,333,797
INFLATED AIRBORNE DISPENSING APPARATUS
Harry T. Kifor, Canton, and David A. Krebs, Akron, Ohio, and Paul V. Bartlett, Alexandria, Va., assignors to Goodyear Aerospace Corporation, Akron, Ohio, a corporation of Delaware
Filed Oct. 21, 1965, Ser. No. 499,228
4 Claims. (Cl. 244—138)

This invention relates to an inflated airborne dispensing apparatus, and more particularly to a unique apparatus for dispening a particular payload at predetermined distances above ground level, which payload may then spread and cover the surface terrain therebelow.

Heretofore, it has been well known that the dispersion of any agent into the air which subsequently drifts downwardly by gravity and in accordance with wind conditions to cover particular sections of the earth's terrain have been necessarily difficult to achieve in a simple, inexpensive, yet highly effective manner. Certain spray applications from aircraft are possible, but where this is done in a war situation, it exposes the aircraft to ground fire. Further, it is always risky to fly an aircraft at very low altitudes. There is not present in the air any simple means for dispersing chemical agents, dry or wet, pamphlets, or any other payload at specific altitudes over the earth's surface and in specific areas.

Therefore, it is the general object of the present invention to provide such an apparatus thereby overcoming the inherent dangers and highly expensive prior known airborne systems by means of a simple inflatable bladder containing the desired agent to be spread which explodes as it passes down through the earth's atmosphere at a specific predetermined altitude over the earth's surface.

A further object of the invention is to utilize a simple actuation means in association with an airborne dispensing apparatus whereby a ground sensor in the form of a small heavy disc hangs by a tethering cord from an inflated bladder to actuate or trigger explosion of the bladder when the disc or sensor hits the earth's surface, with the tether line providing the predetermined explosion altitude of the bladder over the earth's surface.

A further object of the invention is to provide an airborne dispensing apparatus which may be packaged in a small cylindrically shaped container and injected into the earth's atmosphere with subsequent inflation of a bladder and unfurling of the ground sensor and activation of the explosive mechanism which subsequently causes explosion of the bladder at a proper altitude above the earth's surface.

The aforesaid objects of the invention and other objects which will become apparent as the description proceeds are achieved by providing in an airborne dispensing apparatus as one embodiment of the combination of an inflatable bladder, a payload within the bladder, means to inflate the bladder, an explosive mechanism attached to the bladder designed to selectively burst the inflated bladder, a spring loaded actuator connected to the explosive mechanism whereby when the bladder is inflated and pulled by gravity through the earth's atmosphere, the sensors tends to fall faster to hold the leader means taut thereby moving the actuator against the spring loading thereof, and means to inject the bladder into the atmosphere above the earth and simultaneously actuate the inflation means therefor.

For a better understanding of the apparatus and operational sequence of the invention, reference should be had to the accompanying drawings, wherein:

FIGURE 4 is an illustration of the dispenser in the fully inflated state with the ground sensor fully deployed, and the explosion mechanism actuated; and FIGURE 5 is a schematic illustration of the ground sensor shown engaging the earth and thereby actuating the explosion mechanism for the dispenser.

It should be understood that the apparatus of the invention comprises basically an inflatable bladder carrying an agent desired to be spread over the earth's surface which incorporates a ground sensor disc and a tether cable or line to cause explosion of the bladder and thus dispersion of the agent at a predetermined distance above the earth's surface. Naturally, any means for putting such apparatus into the earth's atmosphere above the desired point on the earth's terrain will meet the objects of the invention. It is thought that generally an aircraft will serve this purpose with the apparatus being ejected from the aircraft as it passes over the proper section of the earth's terrain. However, any other means such as a rocket, motor type launcher, or other suitable vehicle for placing the apparatus in launch position will meet the desired objects.

Figure 1:
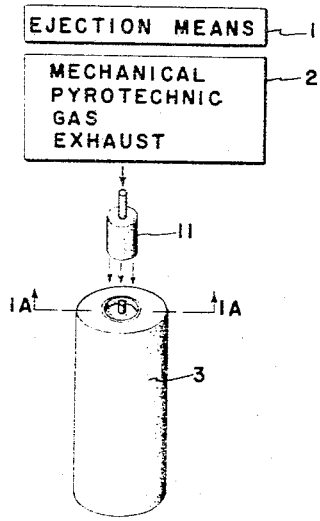
FIGURE 1 is a plan schematic view of typical apparatus which might be utilized for injecting the dispenser into the earth's atmosphere.
Figure 1A:
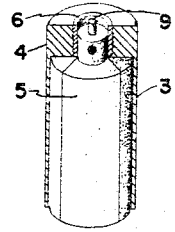
FIGURE 1A is a cross sectional view of the dispenser taken on line 1A—1A of FIGURE 1.
Figure 3:
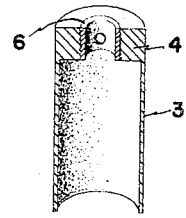
FIGURE 3 is a perspective illustration in exploded relation of the connection between the ejector and the dispenser mechanisms.
Figure 3:
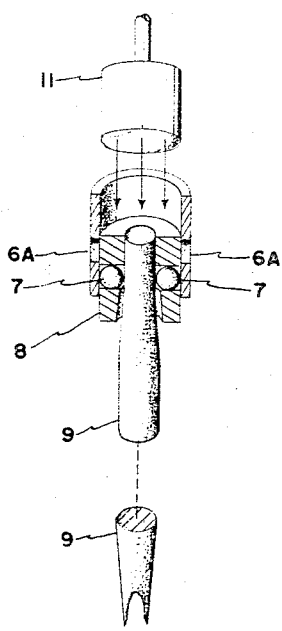

Thus, with reference to the form of the invention illustrated in the drawings, the numeral 1 illustrates an ejection means which may be actuated by any of several means including mechanical, pyrotechnics, gas or suitable exhaust, and indicated generally by numeral 2. The invention contemplates that the means 1 will be operated in conjunction with an injection tube 3 slidably received in housed relationship in the dispensing apparatus of the invention illustrated generally by the numeral 5. As seen in FIGURE 1A, the top end 4 of the tube 1 threadably receives a locking ring 6. The ring 6 has a plurality of holes 6A which are adapted to mate in locking relation with a plurality of balls 7 carried by a cylindrically shaped piston 8 which may be slidably received by the ring 6. The piston 8 is in turn slidably mounted on an actuating pin 9. FIGURE 3 clearly shows the structural relationship of these components. With the pin 9 in the upward position indicated in FIGURE 1A the balls 7 are forced into the holes 6A and thus hold the piston 8 in locked relation to ring 6. The pin 9, in the upward position indicated in FIGURE 1A, rests at its lower pointed end on the top of a typical $CO_2$ cartridge 10, as best seen in FIGURE 2.

In order to release the dispenser 5 from tube 3 an actuating piston 11 is driven by the ejection means 1 to depress pin 9 thereby puncturing the top of the cartridge 10 and simultaneously allowing release of the balls 7 so the dispenser 5 falls by gravity from the tube 3. In other words with the actuating pin 9 in the up position indicated in FIGURE 1A it pushes the balls radially outwardly to lock the dispenser 5 in relation to ring 6. Whereas when pin 9 is pushed to the downward position indicated in FIGURE 2, the balls 7 are released by any suitable mechanical relationship with pin 9 so the piston 8 is released allowing dispenser 5 to fall from tube 3.

It is contemplated that the dispenser tube 1 might be located in appropriate aircraft with actuation of the means 1 then controlled manually or automatically when the aircraft passes over the desired section of the earth's terrain.

Figure 2:
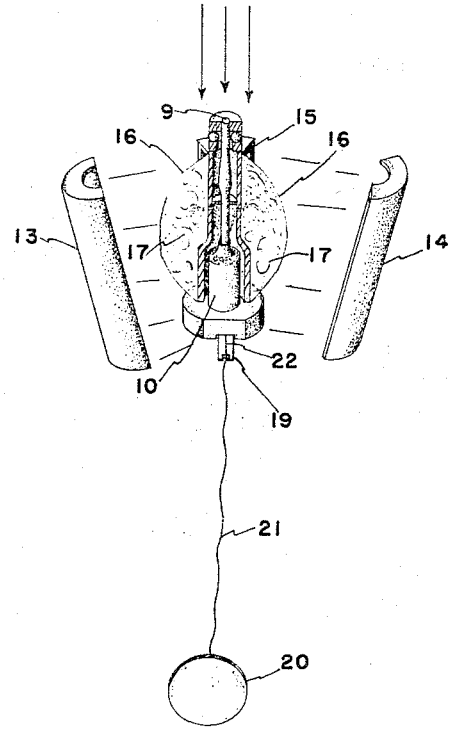
FIGURE 2 is a schematic perspective illustration of the dispensing means after it has been ejected from the dispenser tube as it is starting to inflate and deploy the ground sensor.

As more clearly seen in FIGURE 2, the apparatus 5 includes partial cylindrically shaped shell housings 13, 14, and 15 which fall off when a bladder 16 begins to inflate by means of the cartridge 10. The cartridge 10 is normally actuated upon the ejection of the apparatus 5 from the tube 3, as described above, so that inflation begins almost immediately thereafter. The cartridge 10 may utilize any suitable gas in compressed or liquid form, such as $CO_2$, thus causing inflation of the bladder 16.

In order to achieve the desired objects of the invention, it is anticipated that the bladder 16 will be filled with the desired payload before the inflation thereof. Note, for example in FIGURES 2 and 4, the small particles 17 seen in the broken away section of the bladder 16. Naturally, it is anticipated that the agent 17 might be dry, wet, pamphlets, or any other payload which might be carried inside the bladder 16 to be dispersed upon explosion of the bladder at the proper height over the earth's terrain as more fully explained hereinafter. To complete the actual structural aspects of the apparatus 5, an explosion mechanism is mounted on the bladder 8 substantially opposite to the inflation cartridge 10 and is combined with an actuator 19 as more fully explained hereafter. A ground sensor 20 which is normally a heavy disc shaped object is connected to one end of the actuator 19 by a suitable tether line 21.

FIGURE 4 illustrates the apparatus in a fully deployed condition. Note that the bladder 16 has inflated to a considerable size which causes a wider dispersion of the particles 17 therewithin. Since the full inflation of the bladder 16 causes it to be somewhat retarded by the earth's atmosphere, the smaller heavy ground sensor will fall more quickly through the atmosphere thus causing the tether line 21 to become fully elongated. As an important feature of the invention, the elongation of the tether line 21 has sufficient force to overcome the spring bias normally holding the actuator 19 in a deactuated position. However, with the sensor 20 tending to fall at a faster rate than the bladder 16, the spring tension on the actuator 19 is overcome causing it to come to an actuated or cocked position as indicated in the drawing, thereby exposing a sharp firing pin 22. Thus, it should be understood that the length of the tether line 21 controls the altitude over the earth's surface at which the bladder will be exploded, since the slackening of the line 21 causes the pin 22 to snap back thereby detonating the mechanism.

Thus, with reference to FIGURE 5, it is seen that the sensor 20 has engaged the ground 23 causing the tether line 21 to slacken, which in turn uncocks or deactuates the spring loaded pin 22 allowing it to snap back thereby piercing the inflated bladder 16 which in turn causes the complete explosion of the bladder 16 into a plurality of fragments, and also disperses the agent 17 in a wide pattern. Naturally, at this point, the agent 17 will fall over that area of the earth's terrain as it is blown by the wind and acted on by the force of gravity.

Any sutiable type of actuator and/or explosive mechanism which may be cocked or actuated by the deployment of the ground sensor and triggered its action when the sensor hits the ground will meet the object of the invention.

Thus, it is seen that an extremely simple, yet highly effective airborne dispensing apparatus has been provided which is inexpensive, yet extremely effective to dispense any desired payload at a predetermined height over a specified section of the earth's terrain.

While in accordance with the patent statutes only one best known embodiment of the invention has been illustrated and described in detail, it is to be particularly understood that the invention is not limited thereto or thereby, but that the inventive scope is defined in the appended claims.

What is claimed is:
1. In an airborne dispensing apparatus the combination of
   an inflatable bladder,
   a payload contained within the bladder,
   means to inflate the bladder,
   an explosive mechanism attached to the bladder and designed to burst same when properly actuated,
   a spring loaded actuator connected to the explosive mechanism,
   a heavy disc shaped ground sensor,
   leader means tethering the sensor to the actuator for the explosion mechanism whereby when the bladder is inflated and pulled by gravity through the earth's atmosphere, the sensor tends to fall faster to hold the leader means taut thereby activating the actuator against the spring loading thereof, so when the sensor hits the earth the explosive mechanism will detonate the inflated bladder at a predetermined distance from the earth, and
   means to inject the bladder into the atmosphere above the earth and simultaneously actuate the inflation means therefor.

2. In combination
   an inflatable bladder,
   a payload loosely carried within the bladder,
   explosive means connected to the bladder to effect explosion thereof upon proper actuation,
   spring loaded actuation means associated with the explosive means,
   a small relatively heavy ground sensor, and
   an inextensible tether connecting the sensor to the actuation means, said sensor having the aerodynamic property to fall faster through the earth's atmosphere than the bladder when inflated whereby the tether is extended and overcomes the spring load of the actuation means thereby activating same, and a subsequent slackening in the tether will thereby cause the explosive means to detonate.

3. In an airborne dispensing apparatus the combination of
   an inflatable bladder,
   a payload randomly positioned without connection within the bladder,
   means to inflate the bladder with a gas,
   an explosive mechanism attached to the bladder and designed to burst same when properly actuated,
   a spring loaded actuator connected to the mechanism,
   a heavy ground sensor,
   leader means tethering the sensor to the actuator for the explosion mechanism whereby when the bladder is inflated and pulled by gravity through the earth's atmosphere, the sensor tends to fall faster to hold the leader means taut thereby activating the actuator against the spring loading thereof, and
   means to inject the bladder into the atmosphere a desired section of the earth's terrain and simultaneously actuate the inflation means therefor.

4. In combination
   an inflatable bladder,
   a dry payload carried without connection thereto within the bladder,
   means connected to the bladder to effect bursting thereof upon proper actuation,
   spring loaded actuation means associated with the last said means,
   a small heavy ground sensor, and a tether connecting the sensor to the actuation means retaining said actuation means cocked under normal falling conditions, said sensor having the aerodynamic property to fall faster through the earth's atmosphere than the bladder when inflated whereby the tether is extended when said ground sensor strikes the ground, said tether slackens and overcomes the spring load of the actuation means thereby activating same to burst the bladder.

References Cited

UNITED STATES PATENTS

| | | | |
|---|---|---|---|
| 1,318,926 | 10/1919 | Settle | 102—7.4 X |
| 1,406,633 | 2/1922 | Frisk | 102—7.4 |
| 2,306,321 | 12/1942 | Roberts | 244—136 |
| 2,333,558 | 11/1943 | Gay | 102—7.4 |
| 3,156,442 | 11/1964 | Pourchet | 244—138 |

MILTON BUCHLER, *Primary Examiner.*

B. BELKIN, *Assistant Examiner.*

UNITED STATES PATENT OFFICE
CERTIFICATE OF CORRECTION

Patent No. 3,333,797                 August 1, 1967

Harry T. Kifor et al.

It is hereby certified that error appears in the above numbered patent requiring correction and that the said Letters Patent should read as corrected below.

In the heading to the printed specification, line 4, before "assignors" insert -- said Kifor and said Krebs --.

Signed and sealed this 11th day of June 1968.

(SEAL)
Attest:

Edward M. Fletcher, Jr.  
Attesting Officer

EDWARD J. BRENNER  
Commissioner of Patents